(12) United States Patent
Krasowski et al.

(10) Patent No.: US 10,049,326 B1
(45) Date of Patent: Aug. 14, 2018

(54) SYSTEMS AND METHODS FOR TRANSFER FUNCTION ESTIMATION USING MEMBERSHIP FUNCTIONS

(71) Applicant: The United States of America as represented by the Administrator of the National Aeronautics and Space Administration, Washington, DC (US)

(72) Inventors: Michael J Krasowski, Chagrin Falls, OH (US); Norman F Prokop, South Euclid, OH (US)

(73) Assignee: The United States of America as Represented by the Admin of National Aeronautics and Space Administration, Washington, DC (US)

( * ) Notice: Subject to any disclaimer, the term of this patent is extended or adjusted under 35 U.S.C. 154(b) by 541 days.

(21) Appl. No.: 13/756,604

(22) Filed: Feb. 1, 2013

(51) Int. Cl.
*G06N 3/04* (2006.01)
*G06N 99/00* (2010.01)

(52) U.S. Cl.
CPC .................. *G06N 99/005* (2013.01)

(58) Field of Classification Search
None
See application file for complete search history.

(56) References Cited

U.S. PATENT DOCUMENTS

| | | | | |
|---|---|---|---|---|
| 5,524,176 A | * | 6/1996 | Narita et al. ................ | 706/2 |
| 5,579,439 A | * | 11/1996 | Khan ................ | 706/2 |
| 5,796,925 A | * | 8/1998 | Deville ................ | G06N 3/0481 |
| | | | | 706/25 |
| 5,822,495 A | * | 10/1998 | Wang et al. ................ | 706/2 |
| 2003/0158709 A1 | * | 8/2003 | Ishida ................ | F02D 41/1405 |
| | | | | 702/189 |

OTHER PUBLICATIONS

J.J. Shann, H.C. Fu, A fuzzy neural network for rule acquiring on fuzzy control systems, Fuzzy Sets and Systems, vol. 71, Issue 3, May 12, 1995, pp. 345-357.*
Hisao Ishibuchi, Kitaek Kwon, Hideo Tanaka, A learning algorithm of fuzzy neural networks with triangular fuzzy weights, Fuzzy Sets and Systems, vol. 71, Issue 3, May 12, 1995, pp. 277-293.*
Wang, Li-Xin; "Fuzzy Systems are Universal Approxinnators"; 1992; IEEE; pp. 1163-1170. (Year: 1992).*
Duch, Wlodzislaw et al.; "Survey of Neural Transfer Functions"; 1999; Neural Computing Surveys 2, 163-212. (Year: 1999).*
Karakose, Mehnnet et al.; "Type-2 Fuzzy Activation Function for Multilayer Feedforward Neural Networks"; IEEE International Conference on Systems, Man and Cybernetics, pp. 3762-3767. (Year: 2004).*

* cited by examiner

*Primary Examiner* — Stanley K. Hill
(74) *Attorney, Agent, or Firm* — Robert H. Earp, III; William M. Johnson

(57) ABSTRACT

An apparatus, method, and computer program that can learn a linear or non-linear transfer function are disclosed. In one embodiment, for example, a computer-implemented method may include creating a plurality of combinations for at least one input, and calculating an output for the plurality of combinations. The method may also include calculating an error based on the calculated output.

7 Claims, 7 Drawing Sheets

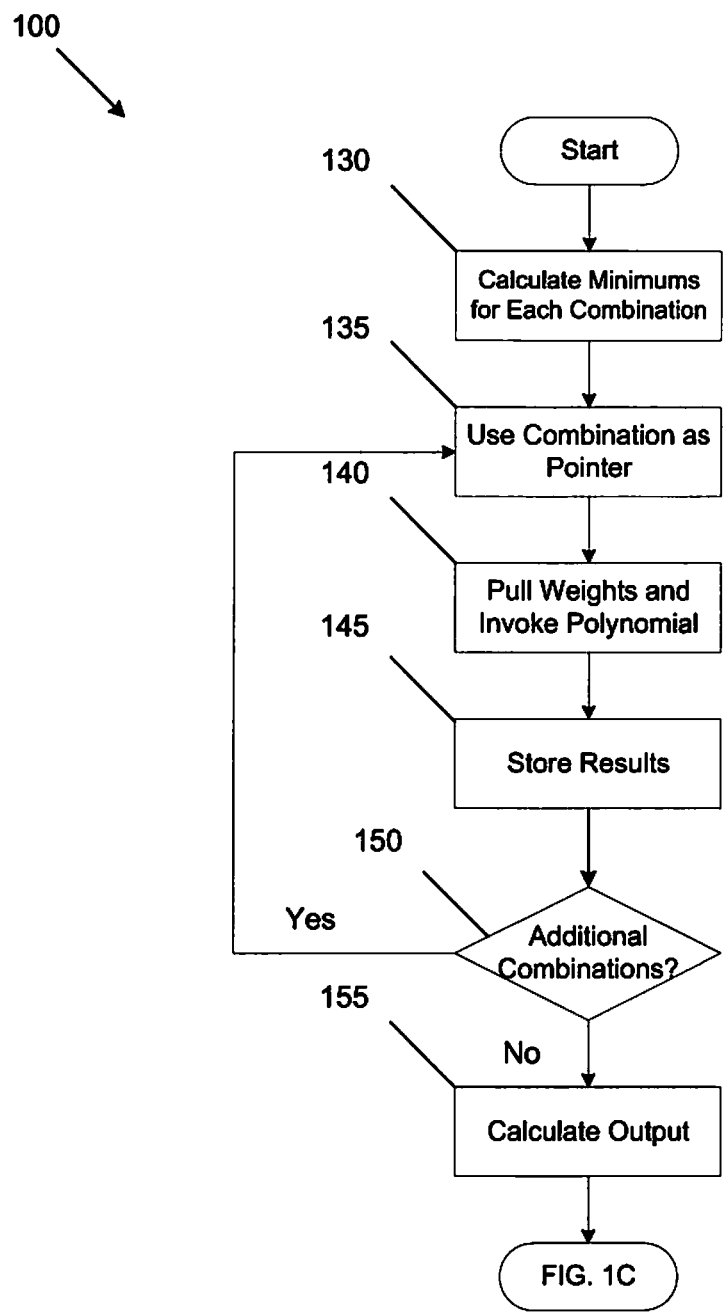

FIG. 2

OPERATING THE FUZZY NEURON EXAMPLE e.g. 8 fuzzifiers associated with each of 2 inputs A and B.
Each input in range of 0..255 (8 bits)

A = 60
B = 186

Input A = 60

Input B = 186

Couplets:

(b, n): min [0.35, 0.83] = 0.35
(b, o): min [0.35, 0.18] = 0.18
(c, n): min [0.65, 0.83] = 0.65
(c, o): min [0.65, 0.18] = 0.18

Combiner Array:

Couplets define (point to) array location of weights for combiner unique to that couplet.

e.g. (b,n,0) = W(A)
(b,n,1) = W(B)
(b,n,2) = C   (a constant)

$f(b,n) = A*W(A) + B*W(B) + C$

Repeat for each couplet $f(b,o)$, $f(c,n)$ and $f(c,o)$ $$\text{Output} = \frac{0.35*f(b,n) + 0.18*f(b,o) + 0.65*f(c,n) + 0.18*f(c,o)}{0.35 + 0.18 + 0.65 + 0.18}$$

SYSTEMS AND METHODS FOR TRANSFER FUNCTION ESTIMATION USING MEMBERSHIP FUNCTIONS

ORIGIN OF THE INVENTION

The invention described herein was made by employees of the United States Government and may be manufactured and used by or for the Government for Government purposes without the payment of any royalties thereon or therefore

FIELD

The present invention is related to a method and hardware realization thereof, and, in particular, to a non-linear method of capturing and effecting a transfer function for a single input, single output function, multiple input, multiple output function, single input, multiple output, etc.

BACKGROUND

Small space flight instruments and other such instruments have been confined to simple systems utilizing microcontrollers and microcontroller cores. Microcontrollers can perform linear transfer function calculations readily, but when non-linear calculations are needed, many microcontrollers do not contain the resources to perform the non-linear calculations. Learning algorithms are one method of solving for and calculating non-linear transfer functions. Most learning algorithms typically reside in larger computation frames and are rather complex. Fuzzy logic systems work well with microcontrollers, but adaptive fuzzy systems require a great deal of computational power. Thus, a simpler solution to a self-learning, auto adaptive system may be attractive for smaller instruments. For example, a method and system for such instruments that may learn a linear or non-linear transfer function may be beneficial.

SUMMARY

Certain embodiments of the present invention may provide solutions to the problems and needs in the art that have not yet been fully identified, appreciated, or solved by current learning systems. For example, the method may allow a system to take any kind of unknown transfer function (linear or non-linear), learn and store the transfer function, and effect the system when embedded, for example, in a micro-controller.

In one embodiment, a computer-implemented method is provided. The computer-implemented method includes creating, by a computing system, a plurality of combinations for at least one input, and calculating an output for the plurality of combinations. The computer-implemented method may also include calculating, by the computing system, an error based on the calculated output.

In another embodiment, an apparatus is provided. The apparatus includes at least one processor, and memory including a computer program. The computer program, with the at least one processor, is configured to cause the apparatus to create a plurality of combinations for at least one input, calculate an output for the plurality of combinations, and calculate an error based on the calculated output.

In yet another embodiment, a computer-implemented method is provided. The computer-implemented method includes calculating, by a computing system, an output value for the at least one input, and calculating an error value for the at least one input based on the output value and a desired output. The computer-implemented method also includes updating at least one weight and a constant associated with each combination for the at least one input.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIGS. 1A-1C are flow diagrams illustrating a process for operating or training a fuzzy neuron, according to an embodiment of the present invention.

FIG. 2 is a diagram illustrating operation of a fuzzy neuron, according to an embodiment of the present invention.

DETAILED DESCRIPTION OF THE EMBODIMENTS

One or more embodiments pertain to a method that allows single-to-multi-input, single-to-many-outputs system transfer functions to be estimated from input/output data sets. The method may run in the background while the system is operating for other purposes or may be utilized offline using data sets created from observations of the estimated system. The method may utilize a set of fuzzy membership functions spanning the input space for each input variable. Linear combiners associated with combinations of input membership functions may be used to create the ouput(s) of the estimator. Coefficients may be adjusted on line through the use of the learning algorithms.

The method may create usable models that can effect any number of complex transfer functions such as a continuous exclusive OR function, time domain (slew rate) filter, automatic gain controller, non-linear algebraic function calculator, etc. This method may be embedded within microcontrollers, facilitating simple and effective placement of learning functions and adaptive elements into small hardware systems, including instruments for space, bioimplantable devices, stochastic observers, etc.

Figure 1A:
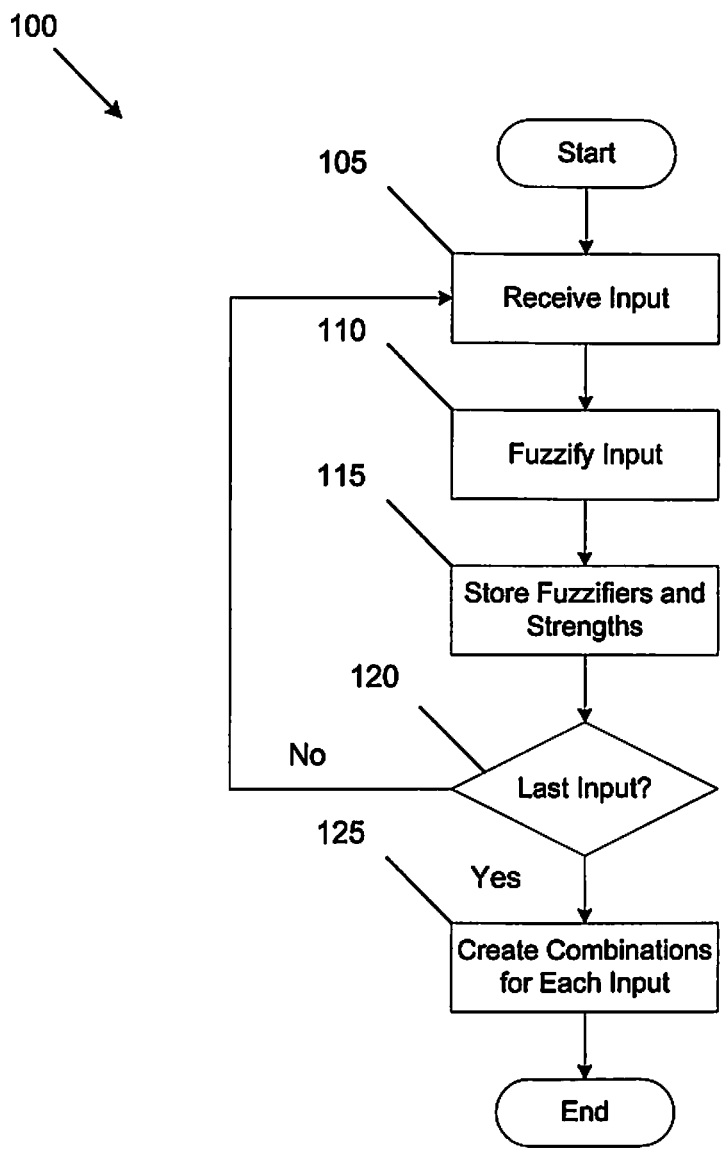
Figure 1C:
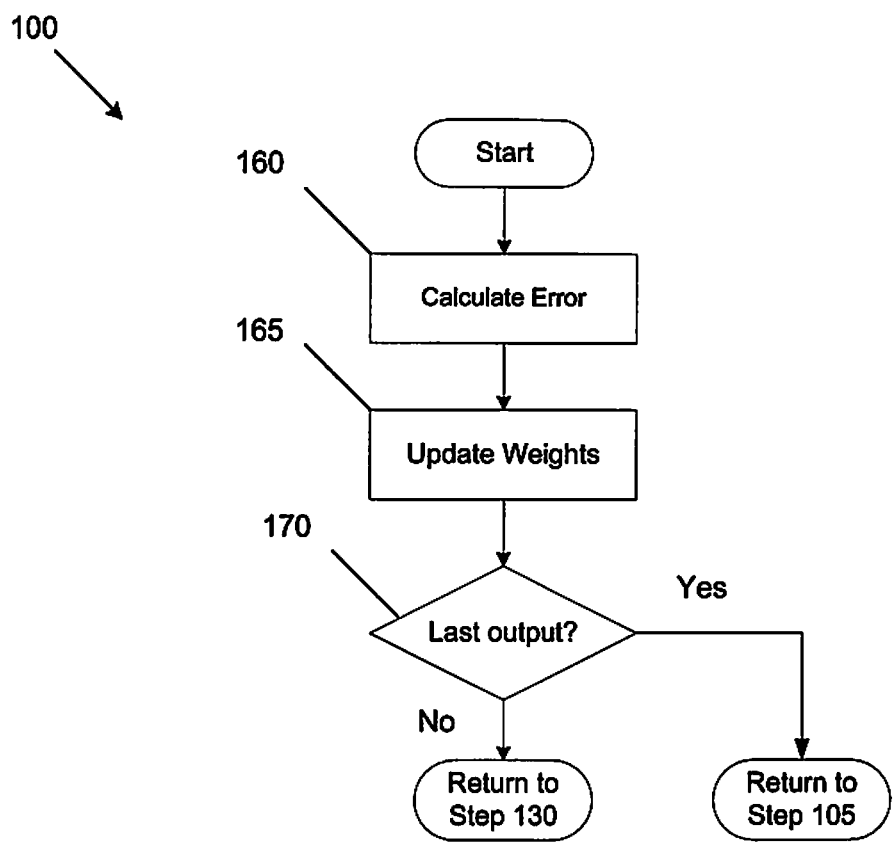

FIGS. 1A-1C are flow diagrams 100 illustrating a process for operating or training a fuzzy neuron, according to an embodiment of the present invention. The following description of the process shown in FIGS. 1A-1C is provided in conjunction with FIGS. 2 and 3.

Figure 3:
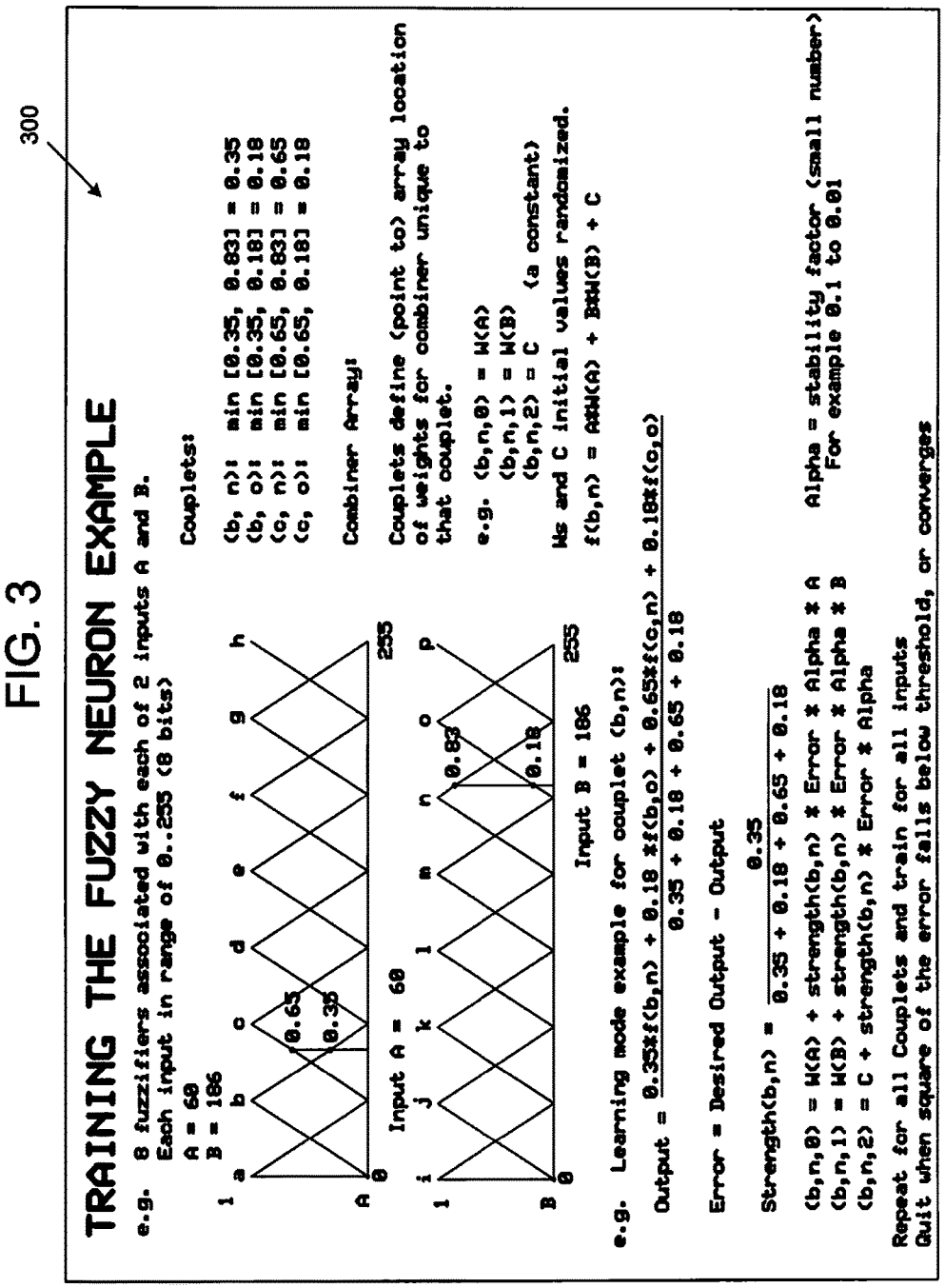
FIG. 3 is a diagram illustrating training of a fuzzy neuron, according to an embodiment of the present invention.

In FIG. 1A, the process begins at 105 with a computing system receiving an input for a transfer function from, for example, a computing unit. In certain embodiments, the computing unit may be a microcontroller, a processor, an analog-to-digital (A-to-D) converter, a data bus, etc. In FIGS. 2 and 3, for example, input A is received and fuzzifiers a through h are associated with input A.

At 110, the computing system fuzzifies the first input. For example, membership of an input variable in a membership function or fuzzifier spans the range of 0, no membership to 1, or complete membership. In this example, the computing system compares a value of the first input (input A) against fuzzifiers a through h. Referring to FIGS. 2 and/or 3, because input A has a value of 60 in this example, the membership of input A in fuzzifier b is 0.35 and the membership of input A in fuzzifier c is 0.65. Once the first input has been fuzzified, the computing system at 115 stores the fuzzifiers that, for example, input A was a member of for later use as pointers to weight coefficients and constants used in functions to combine input variables, and stores the strengths of the membership to be used to modulate the result of this combining.

The computing system at 120 determines whether there are additional inputs. If there are additional inputs, the process returns to 105 to receive the next input. In the example described in FIGS. 2 and 3, the computing system may determine that there is an additional input, e.g., input B. The process may then return to 105 in order to receive input B and then processes steps 110 through 120 are executed for input B. It should be noted that in this embodiment fuzzifiers i through p shown in FIGS. 2 and 3 are the same fuzzifiers as a through h. This last qualification defines a minimalist configuration for this embodiment, such that each input may be iteratively compared to the same set of fuzzifiers and, as such, is easiest to realize in software or embed in hardware. It should be appreciated that another process may be realized for this fuzzifier stage.

In a single input system, if there are no additional inputs, the computing system at 125 associates the fuzzifiers, which the single input A is a member of, to the strength of membership that input A had to that fuzzifier. For a two input system (e.g., inputs A and B), four couplets (or combinations of fuzzifiers) shown in FIGS. 2 and 3 are created, e.g., combination couplet (b,n), combination couplet (b, o), combination couplet (c, n), and combination couplet (c, o), for inputs A and B.

At 130, the computing system calculates the minimum values of membership for each combination that were created for the input. For example, FIGS. 2 and 3 show the minimum values (e.g., 0.35, 0.18, 0.65, and 0.18) that are calculated for each combination (e.g., couplet (b, n), couplet (b, o), couplet (c, n), and couplet (c, o)) for inputs A and B.

At 135, a single fuzzifier in single input system, or a combination of fuzzifiers in a multiple input system, may be used as a pointer (or address) to a location within a software or hardware data structure. The software or hardware data structure may include a stored weight and constant (in the single input system) or a weight per input and a constant (multi-input system), all of which are used to create a combiner function or polynomial. In this example, FIGS. 2 and 3 show that the combination (b, n, 0) points to weight W(A) (e.g., the weight used to modulate input A in the combiner function) at location 0, the combination (b, n, 1) points to weight W(B) (the weight used to modulate input B in the combiner function) at location 1, and the combination (b, n, 2) points to the constant at location 2. When the process is utilized for operating a fuzzy neuron, the weights and constant may be predefined numbers (see FIG. 2). However, when the process is utilized for training the fuzzy neuron, the weights and constant are initialized as random numbers prior to training (see FIG. 3).

The computing system at 140 uses or pulls the weights and constant from memory for the combination using the pointer generated in 135, and invokes a combiner polynomial. For example, in FIGS. 2 and 3, for combination (b, n), the following polynomial may be used: $f(b, n) = A*W(A) + B*W(B) + C$. The result from the polynomial is stored at 145.

At 150, the computing system determines whether there are additional combinations. If the computing system determines that additional combinations exist for the input, then the process returns to 135. For example, in FIGS. 2 and 3, the computing system may determine that there are additional combinations (e.g., couplet (b, o), couplet (c, n), couplet (c, o)) for input A, and may repeat steps 135 to 150 until there are no further combinations left for input A.

If the computing system determines that there are no additional combinations for the input, the computing system at 155 may calculate the output for the associated input or inputs. In FIGS. 2 and 3, the output is calculated by using the minimums and the associated result from step 145.

If the process is utilized to train a fuzzy neuron, the computing system at 160 calculates the error using the calculated output from step 155 and a desired output. In one embodiment, the error may be calculated using the following equation: error=desired output−calculated output. See, for example, FIG. 3. It should be appreciated that the desired output may be a predetermined number in some embodiments, or created in runtime in other embodiments. At 165, the computing system updates the weights and constant for each combination for the input based on the calculated error, the strength for each of the combinations and a-priori determined or time/sample variant stability factor (a small number or function used to settle the learning algorithm). It should be appreciated that learning may continue for an infinite duration for an infinite input set (e.g., within an observer application) or may cease based on some convergence criterion such as, but not limited to, minimized error gradient, and combiner weights and constants stored for an embedded steady state application.

At 170, the computing system determines whether all outputs have been calculated. If the computing system determines that an additional output needs calculated, the computing system returns to 130. For example, because FIG. 3 shows two inputs (e.g., inputs A and B), the computing system will return to 130 to calculate minimums for each combination for input B, such that the output for input B can be calculated via steps 135-155. If there is no additional output to be calculated, the computing system returns to 105 to receive the next input. This process may continue until the error falls below a threshold level or converges.

The process steps shown in FIGS. 1A to 1C may be performed, in part, by a computer program, encoding instructions for a nonlinear adaptive processor to cause at least the process described in FIGS. 1A to 1C to be performed by the apparatuses discussed herein. The computer program may be embodied on a non-transitory computer readable medium. The computer readable medium may be, but is not limited to, a hard disk drive, a flash device, a random access memory, a tape, or any other such medium used to store data. The computer program may include encoded instructions for controlling the nonlinear adaptive processor to implement the method described in FIGS. 1A to 1C, which may also be stored on the computer readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC"). Since a steady state application may utilize analog inputs and outputs, window comparisons with minimum calculations (e.g., fuzzifiers) and linear combiners, a target embodiment may be realized using analog computing techniques, both electronic and mechanical.

Figure 4:
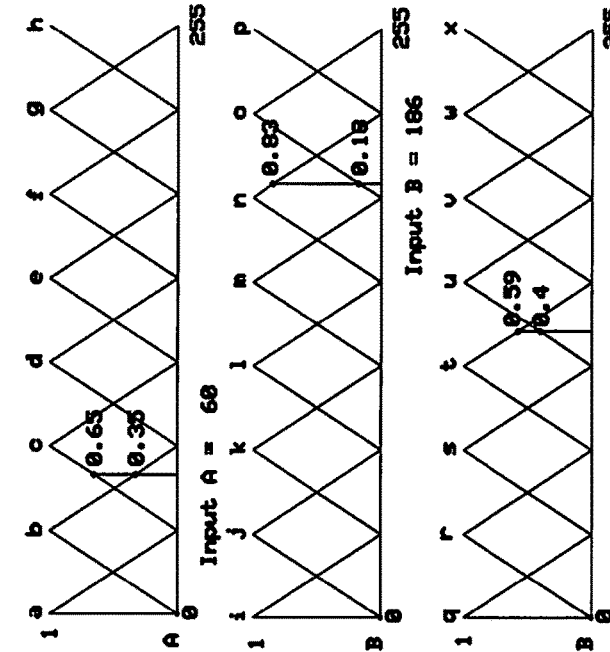
FIG. 4 is a diagram illustrating an example of scaling of a fuzzy neuron, according to an embodiment of the present invention.

FIG. 4 is a diagram 400 illustrating an example of scaling of a fuzzy neuron, according to an embodiment of the present invention. In this example, 8 fuzzifiers are associated with each of the 3 inputs, inputs A, B, and C. The number of combinations of fuzzifiers for N inputs is $2^N$. The number of sets of weights (N+1) and constants for any output is $M^N$, where M is the number of membership functions (or fuzzifiers).

However, in the case, for a system with N inputs, M fuzzifiers, and Q outputs, there may be $2^N$ combinations of fuzzifiers for a set of N inputs and a total of $Q*M^N$ sets of (N+1) weights and constants for the system. It should be appreciated that by storing additional weights and constant sets at each location pointed to by a membership function combination, each associated with a unique output, additional outputs can be accounted enabling construction of an N input, Q output system (where N may, but does not necessarily, equal Q).

Figure 5:
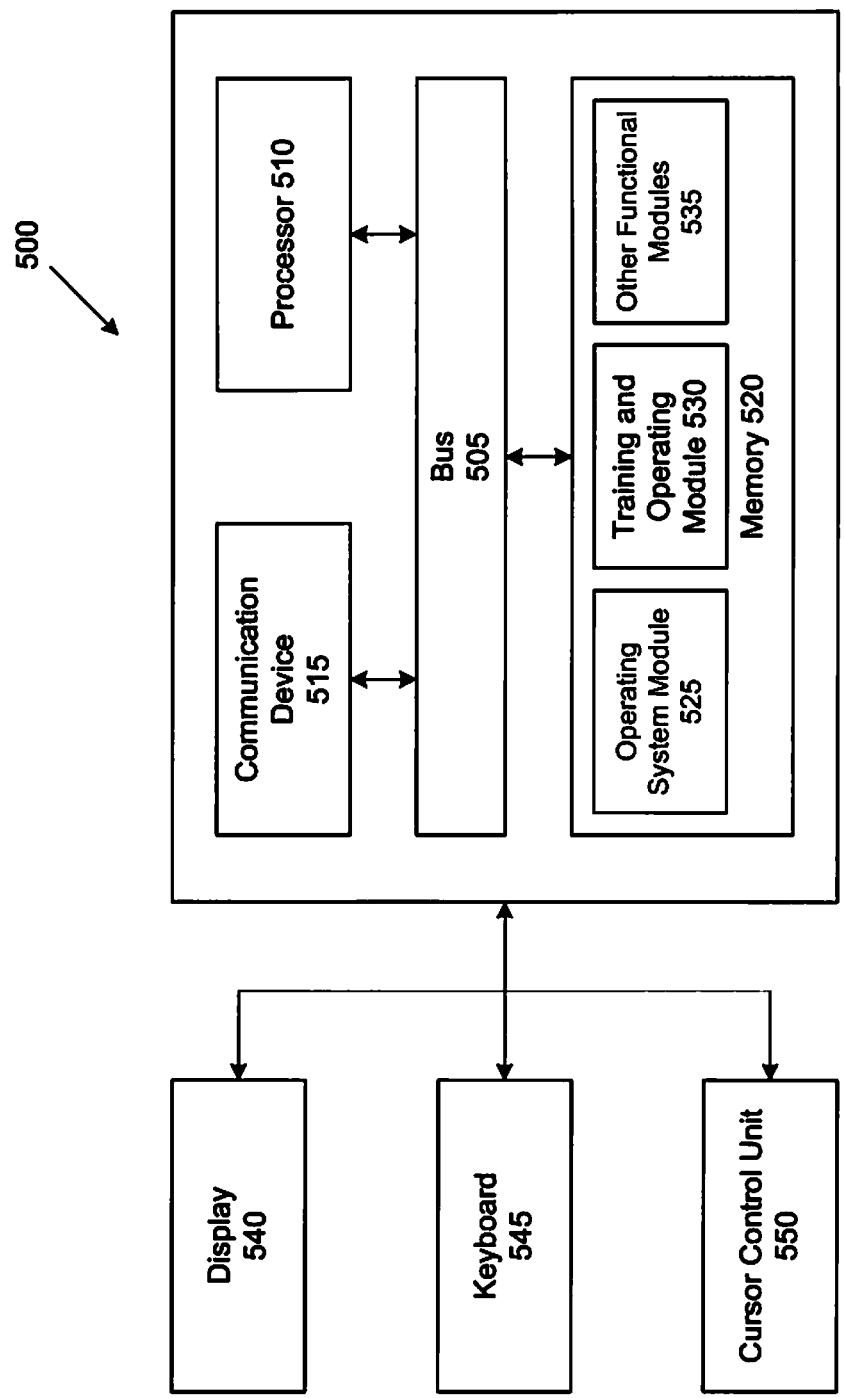
FIG. 5 illustrates a block diagram of a computing system, according to an embodiment of the present invention.

FIG. 5 illustrates a block diagram 500 of a computing system, according to an embodiment of the present invention. System 500 may include a bus 505 or other communication mechanism that can communicate information and a processor 510, coupled to bus 505, that can process information. Processor 510 can be any type of general or specific purpose processor. System 500 may also include memory 520 that can store information and instructions to be executed by processor 510. Memory 520 can be comprised of any combination of random access memory ("RAM"), read only memory ("ROM"), static storage such as a magnetic or optical disk, or any other type of computer readable medium. System 500 may also include a communication device 515, such as a network interface card, that may provide access to a network.

The computer readable medium may be any available media that can be accessed by processor 510. The computer readable medium may include both volatile and nonvolatile medium, removable and non-removable media, and communication media. The communication media may include computer readable instructions, data structures, program modules, or other data and may include any information delivery media.

Processor 510 can also be coupled via bus 505 to a display 540, such as a Liquid Crystal Display ("LCD"). Display 540 may display information to the user. A keyboard 545 and a cursor control unit 550, such as a computer mouse, may also be coupled to bus 505 to enable the user to interface with system 500.

According to one embodiment, memory 520 may store software modules that may provide functionality when executed by processor 510. The modules can include an operating system 525 and training and operating module 530, as well as other functional modules 535. Operating system 525 may provide operating system functionality for system 500. Because system 500 may be part of a larger system, system 500 may include one or more additional functional modules 535 to include the additional functionality.

One skilled in the art will appreciate that a "system" could be embodied as a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

One or more embodiments pertain to an apparatus, method, and a computer program configured to create a plurality of combinations for at least one input and calculate an output for the plurality of combinations. An error may also be calculated using the calculated output.

It will be readily understood that the components of the invention, as generally described and illustrated in the figures herein, may be arranged and designed in a wide variety of different configurations. Thus, the detailed description of the embodiments is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
   storing, by a computing system, a plurality of sets of component values of a linear process in association with a plurality of pointers, wherein each one of the plurality of pointers is stored in association with one of the plurality of sets of component values of the linear process, wherein each one of the plurality of pointers comprises designations of at least two membership functions of a plurality of membership functions;
   receiving, by the computing system, input data, the input data comprising a first input value and a second input value;
   classifying, by the computing system, the input data based on the plurality of membership functions, wherein each membership function provides a membership fraction for an input value that varies as a function of that input value, wherein each membership fraction indicates a strength of membership associated with a corresponding one of the membership functions, wherein classifying the input data generates classifying data, wherein the classifying data comprises:
      a first set of non-zero membership fractions associated with a first set of membership functions for the first input value;
      a second set of non-zero membership fractions associated with a second set of membership functions for the second input value; and
      designations associated with membership functions belonging to the first and second sets of membership functions;
   generating, by the computing system, a plurality of combinations of values of the classifying data, wherein each combination comprises:
      a first designation of a first membership function of the first set of membership functions;
      a second designation of a second membership function of the second set of membership functions; and
      a minimum membership fraction between the membership fraction provided by the first membership function and the membership fraction provided by the second membership function, wherein each combination of the plurality of combinations corresponds to one of the plurality of pointers;
   retrieving a subset of the plurality of sets of component values of the linear process for the first and second input values based on the pointers corresponding to the generated combinations;
   calculating, by the computing system, a plurality of intermediate values by performing the linear process on the first and second input values using each retrieved set of component values of the subset; and
   calculating, by the computing system, an output for the input data using a combination of the plurality of intermediate values and the minimum membership fractions associated with the generated combinations, wherein the combination of the plurality of intermediate values and minimum membership fractions is a model of a non-linear transfer function.

2. The computer-implemented method of claim 1, wherein the linear process comprises a weighted polynomial combination of the input data.

3. The computer-implemented method of claim 2, wherein the combination of the plurality of intermediate values and minimum membership fractions associated with the generated combinations comprises multiplying each of the intermediate values by a corresponding minimum membership fraction to generate a plurality of scaled values, adding the plurality of scaled values to generate a scaled sum, and dividing the scaled sum by a sum of the minimum membership fractions of the generated combinations.

4. The computer-implemented method of claim 1, further comprising, calculating, by the computing system, an error based on a difference between the output and a desired value wherein an error is calculated based on each desired output and each calculated output.

5. The computer-implemented method of claim 4, further comprising updating the plurality of sets of component values based on the calculated error.

6. The computer-implemented method of claim 4, wherein the desired value is a predetermined value.

7. The computer-implemented method of claim 4, wherein, prior to updating the plurality of sets of components values, the plurality of sets of component values each comprise a random set of numbers.

* * * * *